United States Patent
Rottner et al.

[11] Patent Number: 5,959,723
[45] Date of Patent: Sep. 28, 1999

[54] APPARATUS FOR CLEANING A TRANSPARENT COVER OF A VIRTUAL CONTACT COLOR FILM SCANNER

[75] Inventors: Bruce E. Rottner, Rochester; James A. Schmieder, Wayland, both of N.Y.

[73] Assignee: Eastman Kodak Company, Rochester, N.Y.

[21] Appl. No.: 08/739,085

[22] Filed: Oct. 28, 1996

[51] Int. Cl.[6] ........................... G03B 27/62; G03B 27/58; G03B 27/64
[52] U.S. Cl. .................. 355/75; 355/72; 355/76
[58] Field of Search .................. 355/72, 75, 76, 355/27

[56] References Cited

U.S. PATENT DOCUMENTS

| | | | |
|---|---|---|---|
| 3,404,284 | 10/1968 | Doolittle | 250/239 |
| 4,240,691 | 12/1980 | Holmqvist et al. | 350/63 |
| 4,257,695 | 3/1981 | Langworthy | 353/95 |
| 5,153,715 | 10/1992 | Bender et al. | 355/27 |
| 5,192,973 | 3/1993 | Hickisch | 355/215 |
| 5,258,807 | 11/1993 | Reinke | 355/76 |
| 5,267,043 | 11/1993 | Rottner et al. | 358/214 |
| 5,617,186 | 4/1997 | Yanagimoto | 355/75 |
| 5,684,564 | 11/1997 | North | 355/40 |

*Primary Examiner*—Richard Moses
*Assistant Examiner*—Shival Virmani
*Attorney, Agent, or Firm*—Charles E. Snee, III; Gordon M. Stewart

[57] ABSTRACT

Apparatus (10) for scanning photographic film includes a scan gate (14, 16, 18, 26–30) having a film track (14) to guide a filmstrip (50) longitudinally in a direction of travel, a film guide surface (26) in the film track, and an elongated scan aperture (28) through the guide surface, the scan aperture being extended transverse to the film track; an image scanning device (18) positioned opposite the scan aperture, the scanning device including a housing (20) with a window (36), the housing enclosing an elongated array (44) of sensors faced through the window toward the film track opposite the scan aperture, the array of sensors having a length (L) and being spaced from the film guide surface; the scanning device further having a transparent cover (42) between the sensors and the film guide surface; the array and the cover being extended transversely to the film track, whereby a passage (48) for a filmstrip (50) is defined between the cover and the film guide surface; a conduit (78, 80) for delivering pressurized air; and a deflector member (58–74) mounted upstream of the passage for deflecting the air into the passage to clean debris from the cover, the deflector member being configured to spread the air into a thin stream moving in the direction of travel, the stream having a width (W) transverse to the film track, the width being at least as long as the length of the array.

12 Claims, 4 Drawing Sheets

APPARATUS FOR CLEANING A TRANSPARENT COVER OF A VIRTUAL CONTACT COLOR FILM SCANNER

TECHNICAL FIELD

The invention concerns apparatus for electronically scanning photographic film. More particularly, the invention relates to such apparatus in which features are provided for cleaning debris from a cover of an array of scanning sensors.

BACKGROUND OF THE INVENTION

Apparatus is known for scanning photographic color film negatives or transparencies in a plurality of individual component colors. Commonly assigned U.S. Pat. No. 5,153,715 discloses such an apparatus in which a solid state image scanning array comprises a plurality of parallel linear array sensors which are aligned with a scan aperture and exposed directly to an image projected from a film negative or transparency positioned at a film plane at the scan aperture, without the need for any optical features such as lenses or beam splitters between the film and the sensors. The sensors are in near or virtual contact with the film, there being typically only about, 2.5 mm spacing between the two. With a typical cover glass for such array sensors being about 0.65 mm thick, a very narrow passage about 1.0 mm wide remains between the cover glass and the film. The output from the sensor array can be used in a digital printer to produce so-called index prints including small imagettes of the images on a filmstrip, to produce larger prints digitally, or to adjust the color balance of a conventional optical photographic printer to produce conventional photographic prints.

Although the apparatus disclosed in the commonly assigned patent functions admirably for making index prints and for adjustment of color balance, problems can arise when larger digital prints are made, due to accumulation of debris on the cover glass of the sensor array. Accumulations of debris which do not appreciably influence making of index prints or adjusting of color balance can become quite visible on a larger digital print. So, a need has developed for an apparatus for cleaning such a cover glass during operation of the scanner.

SUMMARY OF THE INVENTION

The primary objective of the invention is to provide a virtual contact scanner which includes features for cleaning the cover glass of the array sensor.

A further objective is to provide such a scanner in which the features for cleaning will direct a flow of cleaning air over the entire length of the array sensor and yet are compatible with the tight space constraints required for virtual contact scanners.

Yet another objective is to provide such a scanner in which the features for cleaning can be added to existing scanners in a simple and inexpensive modification.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

The apparatus of the invention is particularly useful for scanning photographic film. As such it may include a scan gate having a film track to guide a filmstrip longitudinally in a direction of travel, a film guide surface in the film track, and an elongated scan aperture through the guide surface, the scan aperture being extended transverse to the film track. An image scanning device is positioned opposite the scan aperture, the scanning device including a housing with a window, the housing enclosing an elongated array of sensors faced through the window toward the film track opposite the scan aperture. The array of sensors has a length and is spaced from the film guide surface. The scanning device further includes a transparent cover between the sensors and the film guide surface; the array and the cover being extended transversely to the film track, whereby a passage for a filmstrip is defined between the cover and the film guide surface. A conduit is provided for delivering pressurized air which impinges on a deflector member mounted upstream of the passage for deflecting the air into the passage to clean debris from the cover. The deflector member is configured to spread the air into a thin stream preferably moving in the direction of travel, the stream having a width transverse to the film track, the width being at least as long as the length of the array.

In a preferred embodiment, the array of sensors is spaced from the film guide surface without interposition of optical means or beam splitting means. The conduit may extend through the housing and the deflector member may be mounted to the housing. The housing may be pivotable away from the scan gate; and the deflector member may be flexible and include an end portion located near the cover; the deflector member further being configured so that the end portion contacts the scan gate when the housing is pivoted into engagement with the scan gate, thereby flexing the deflector member into position to deflect the air into the thin stream. Alternatively, the flow of air may be used to flex the deflector downward into contact with the scan gate. The deflector member may include an elongated base plate extended from the source toward the passage and a pair of side walls on the base plate between which the air flows; and the end portion may include a transverse lip angled to direct the thin stream essentially parallel to the cover. The side walls may have downstream ends spaced from the transverse lip, whereby air flowing from between the walls spreads to produce the desired width of the stream. The housing may include a slot through which the deflector member extends toward the passage; and the deflector member further may include a back wall for closing an exterior end of the slot to minimize flow of the gas opposite to the direction of travel.

The invention provides various advantages. A cleaning flow of air passes through the narrow passage between the film and the cover glass to clean the glass along the length of the array sensor. The flexible deflector engages the scan gate and flexes to a proper position for controlling the air flow, each time the array sensor is engaged with the scan gate, thereby making the assembly less sensitive to adverse combinations of tolerances. The flow of air which cleans the cover glass also helps to clean the portion of the film in closest proximity to the scan gate. The flow of air also prevents dirt transported on the film from transferring to the cover glass. Removal of dirt from the cover glass helps to minimize artifacts on larger digital prints. When the cover glass is kept clean by the flow of air, calibration of the array sensor can be done more reliably since the presence of dirt on the cover glass could prevent a successful calibration.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

Figure 1:
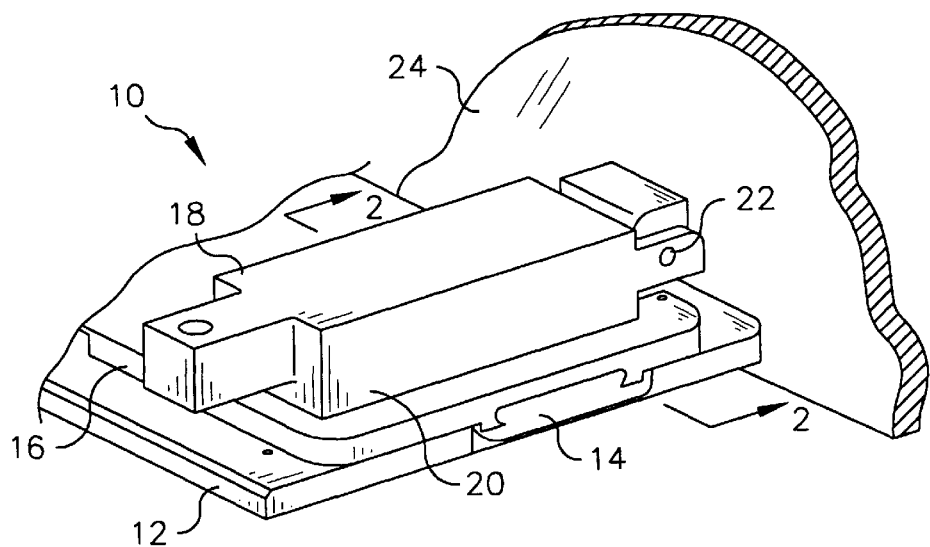
FIG. 1 shows a fragmentary perspective view of a prior art apparatus for scanning photographic film.

The following is a detailed description of the preferred embodiments of the invention, reference being made to the drawings in which the same reference numerals identify the same elements of structure in each of the several Figures.

FIG. 1 shows a fragmentary, perspective view of an apparatus 10 for scanning a photographic filmstrip. A base plate 12 has machined into its upper surface a film track 14 along which a filmstrip moves during scanning. A cover plate 16 closes the upper side of the film track and may be pivotable upward, not illustrated, to facilitate threading a filmstrip through the apparatus. An image scanning device 18 includes a housing 20 having a rearwardly extended pivot 22 which is pivotably mounted to a rigid frame plate 24.

Figure 2:
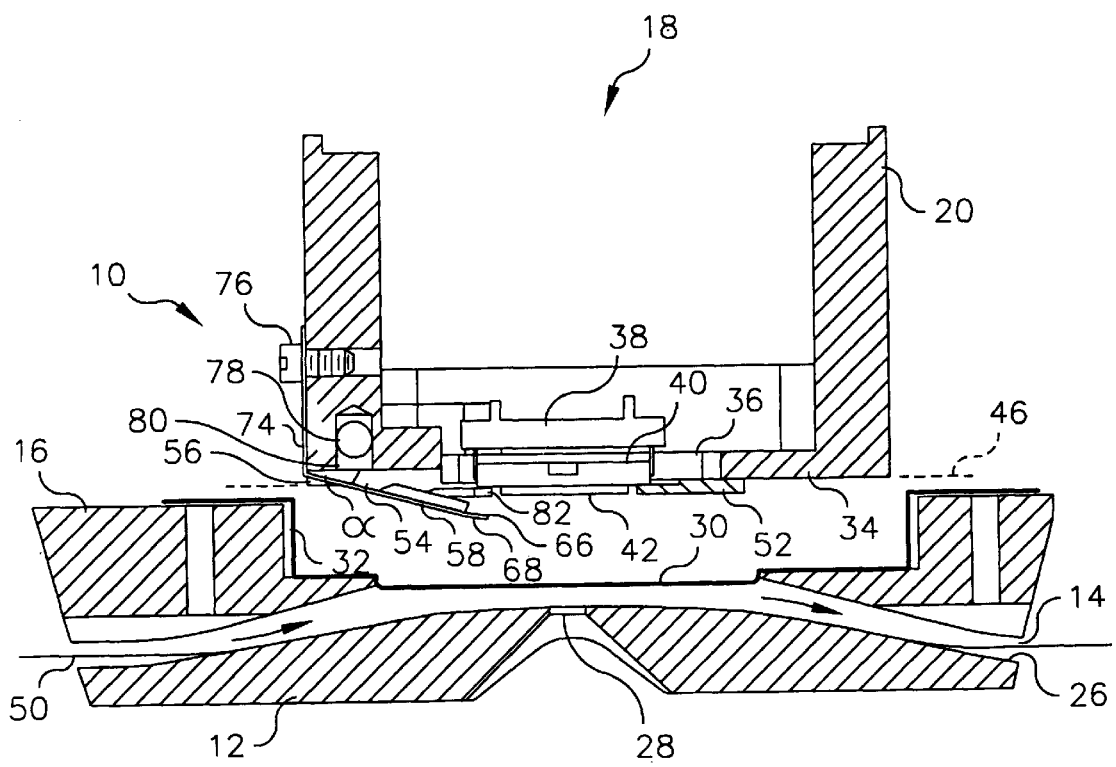
FIG. 2 shows a sectional view taken along line 2—2 of FIG. 1, with a film scanning head raised above a film transport deck and with an apparatus installed in accordance with the invention for cleaning a transparent cover of a sensor in the scanning head.
Figure 3:
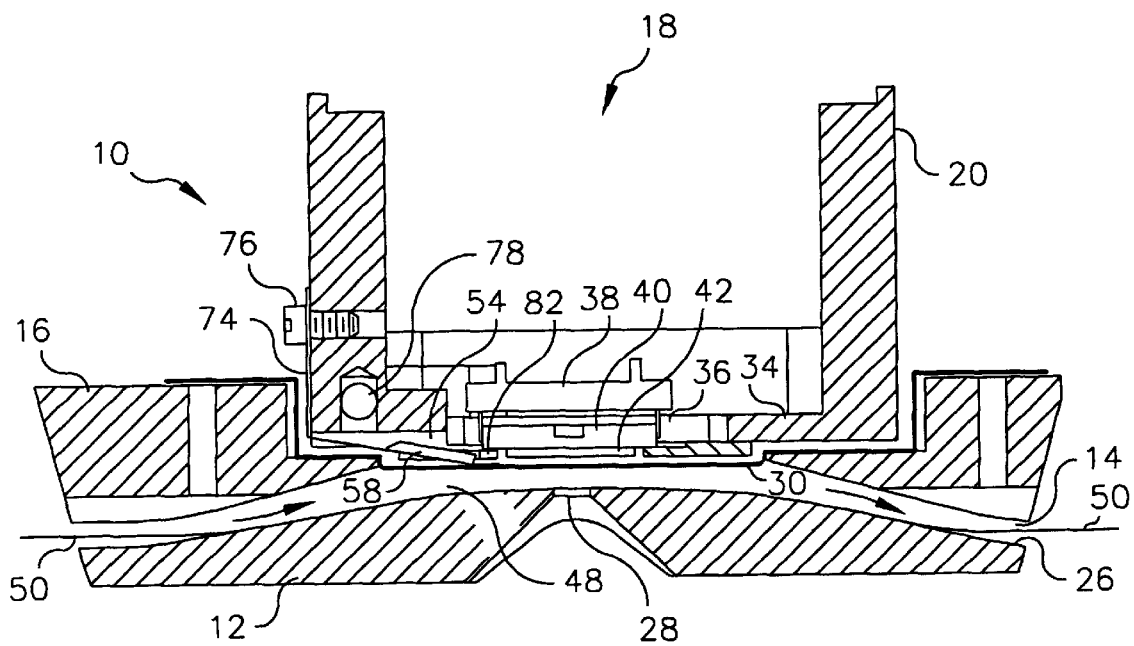
FIG. 3 shows a sectional view taken along line 2—2 of FIG. 1, with the scanning head lowered into operating engagement with the film transport deck.
Figure 4:
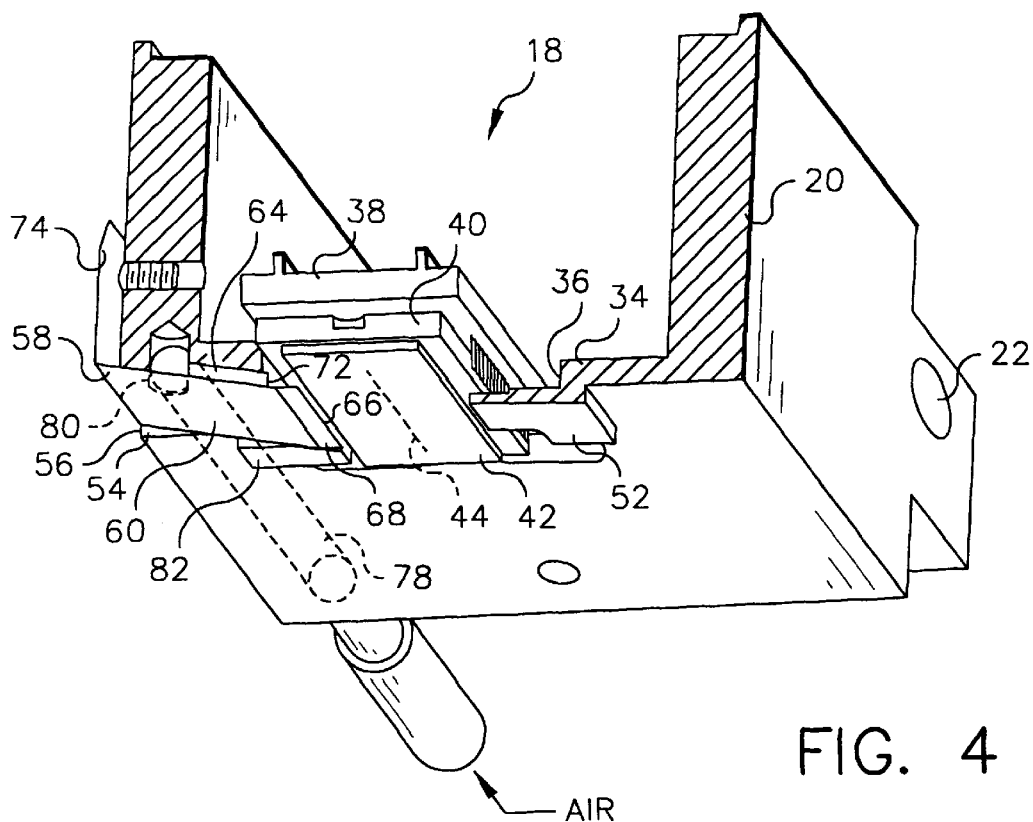
FIG. 4 shows a perspective, sectional view taken along line 2—2 of FIG. 1 from an underside of the scanning head.

FIGS. 2 to 4 show various details of scanning device 18. Film track 14 includes a convexly curved film guide surface 26 over which a film strip is transported during scanning. At about the center of surface 26, in the familiar manner, an elongated scan aperture 28 is formed through base plate 12 transverse to the film track, to permit light from a pinpoint source beneath the apparatus, not illustrated, to pass through a filmstrip moving past the scan aperture. Opposite the scan aperture, a thin film deflector plate 30 extends across an opening 32 through cover plate 16. An opening through deflector plate 30, not illustrated, permits passage of light transmitted through a filmstrip. Thus, a scan gate is defined by film track 14, cover plate 16, guide surface 26, scan aperture 28, and deflector plate 30.

Figure 5:
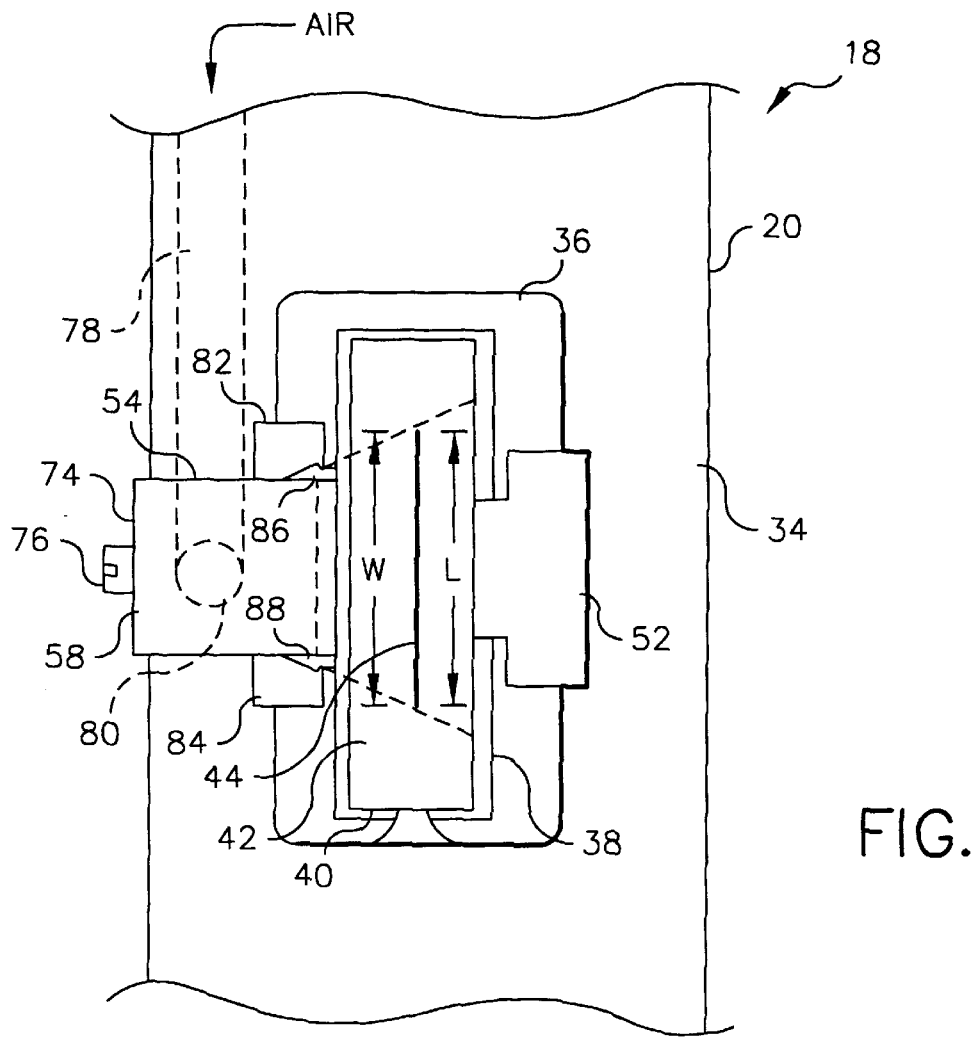
FIG. 5 shows a fragmentary plan view of the underside of the scanning head.

Housing 20 includes a bottom wall 34 having a window 36 which is located opposite scan aperture 28 when scanning device 18 is pivoted to the operating position of FIGS. 2 and 3. Within housing 20 behind window 36, a fixedly mounted circuit board 38 supports a sensor assembly 40 having a transparent cover glass 42 which extends transverse to the film track. An elongated array 44 of sensors, shown schematically in FIGS. 4 and 5, such as the type disclosed in U.S. Pat. No. 5,153,715, is located behind the cover glass and extends transverse to the film track. Array 44 faces through cover glass 42, through window 36 and the opening in deflector plate 30 to receive light transmitted through a filmstrip moving over scan aperture 28. Array 44 may have a length L as shown in FIG. 5 and may be located in a plane 46 shown schematically in FIG. 2.

When scanning device 18 is pivoted to the operating position of FIGS. 1 and 3, a narrow passage 48 is formed between cover glass 42 and film guide surface 26. As indicated previously, passage 48 may be about 1.0 mm wide, with a portion of that width consumed by deflector plate 30. A filmstrip 50 moves through the portion of passage 48 between deflector plate 30 and film guide surface 26, in a direction of travel shown by the arrows in FIGS. 2 and 3. A stop member 52 is attached to bottom wall 34 and extends into window 36 to engage and position sensor assembly 40.

Figure 6:
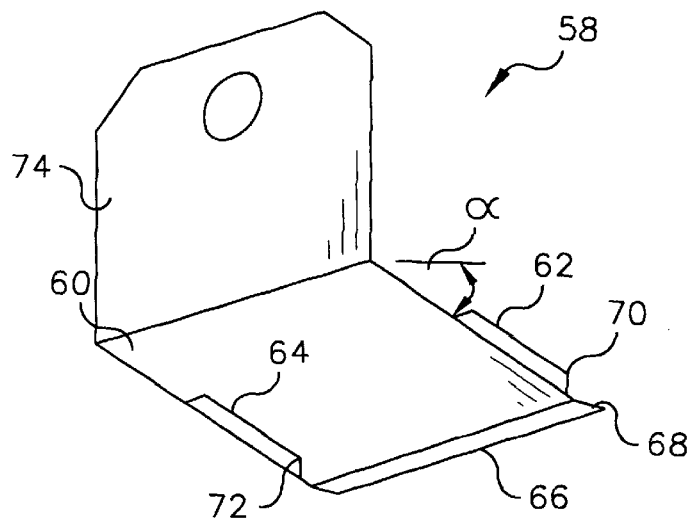
FIG. 6 shows perspective view of a baffle plate in accordance with the invention.

In accordance with the invention, means are provided for directing a thin stream of pressurized air across the surface of cover glass 42 to remove debris which might interfere with scanning. To this end, a slot 54 extends from window 36 in a direction opposite to the direction of travel of the filmstrip. In the illustrated embodiment, slot 54 opens at an exterior end 56 through a side of housing 20. Movably mounted in slot 54 is an air deflector member 58 which comprises an essentially planar, rectangular base plate 60 having a width slightly smaller than that of slot 54. Deflector member 58 may be made from thin gauge metal, for example. On opposite edges of base plate 60, a pair of upwardly extended, side walls 62, 64 are provided. The side walls of the deflector member and those of slot 54 may be parallel, as shown, or may diverge toward the ends of array 44. The side walls should be spaced to enable their outer surfaces to closely engage the side walls of slot 54 during movement of deflector member 58 in a manner shortly to be described. An end portion 66 of the deflector member extends essentially parallel with array 44 and includes a transverse lip 68 which is upwardly angled at about 10 to 20 degrees. As best seen in FIG. 6, the side walls have downstream ends 70, 72 which are spaced from end portion 66 behind lip 68. Formed integrally with base plate 60 is an upwardly extend back wall or plate 74 which serves to close exterior end 56 of slot 54. A suitable fastener such as a screw 76 may be used to secure the deflector member to housing 20. In its relaxed position, shown in FIGS. 2 and 6, base plate 60 preferably is set at an angle α beyond ninety degrees from back plate 74. Angle α may be in a range of 10 to 20 degrees, for example. As a result, deflector member 58 will extend well below the bottom wall of housing 20 before scanning device 18 reaches the operating position of FIGS. 1 and 3.

A conduit 78 is provided through housing 20 to deliver pressurized air into a branch conduit 80 which opens downwardly into slot 54 between side walls 62, 64 just inside back wall 74. When scanning device 18 moves into the operating position, lip 68 preferably will engage film deflector plate 30, causing deflector member 58 to flex into the position of FIG. 3, where end portion 66 is outside the field of view of sensor array 44. Alternatively, the flow of air may be used to flex the deflector downward into contact with the scan gate. To ease movement of the deflector member into slot 54, a pair of guide blocks 82, 84 are provided on the underside of bottom wall 34 on either side of slot 54. Blocks 82, 84 are provided with angled edges 86, 88, shown in FIG. 5, to guide air flowing from between side walls 62, 64. The angle of edges 86, 88 is selected to ensure that the air flow spreads sufficiently to clean the cover glass opposite the array sensor. Because deflector member 58 flexes in this manner as the scanning device moves to its operating position or due to the effect of air flow, tolerances on the part dimensions can be less restrictive.

In the position of FIG. 3, air flowing from conduit 80 impinges more or less perpendicularly on base plate 60 and spreads toward side walls 62, 64 and back wall 74. The walls of the deflector member and the side walls and top of slot 54 cooperate to direct the air forward toward lip 68 which extends essentially parallel and close to a transverse edge of cover glass 42. Thus, the air spreads into a thin stream which moves essentially parallel to the direction of travel of the filmstrip and flows rapidly over the surface of the cover glass to remove debris. The angle of lip 68 causes the air flow to move essentially parallel to the surface of the cover glass. As the thin stream exits from between side walls 62, 64, it expands between angles edges 86, 88 and reaches a width W at least as long as the length L of the sensor array 44. This particularly ensures that the portions of the cover glass opposite the array will be cleaned. A flow of air at a velocity exceeding that of the filmstrip also helps to sweep debris from the surface of filmstrip 50 which is exposed through film deflector plate 30. Because the flow of air is in the direction of film travel, dirt and debris removed by the air are not carried back to the scan gate by the film.

Figure 7:
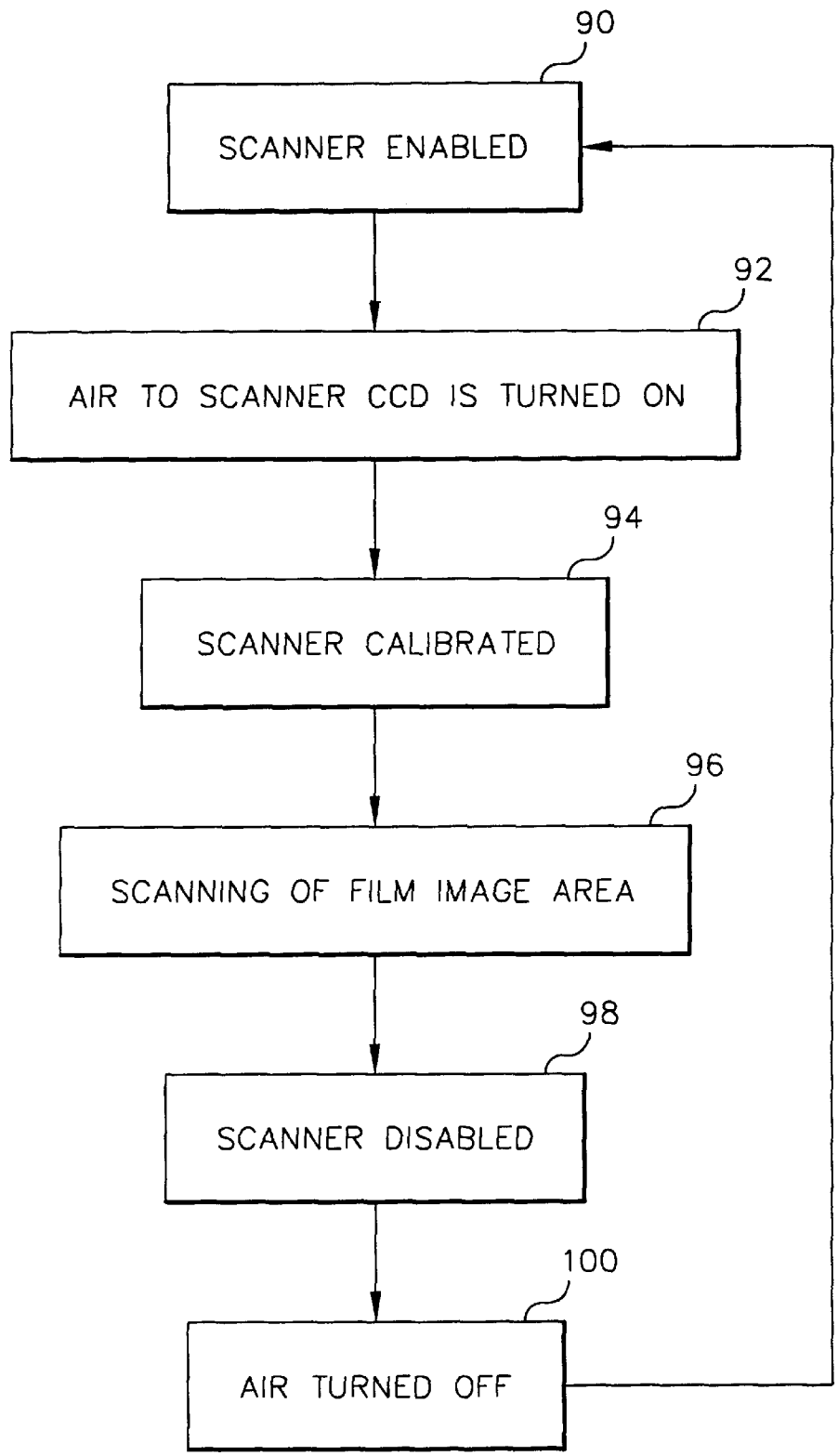
FIG. 7 illustrates the overall mode of operation of the apparatus of the invention.

FIG. 7 illustrates the overall mode of operation of the apparatus of the invention once the scanning device has reached its operating position. At step 90, scanning device 18 is enabled and at step 92, pressurized air is directed through conduits 78, 80 to clean the surface of cover glass 42. The scanning device is then calibrated in a known manner at step 94, once cover glass 42 has been cleaned. Filmstrip 50 is then transported through track 14, while light passes through scan aperture 28; and scanning proceeds at step 96. Upon completion of scanning at step 98, the flow or air is stopped at step 100. The same air flow may be used for cleaning, calibration and scanning; however, different air flows may be used without departing from the scope of our invention.

Parts List

| | | | |
|---|---|---|---|
| 10 | apparatus for scanning photographic film | 48 | narrow passage between 26 and 42 |
| 12 | base plate | 50 | filmstrip |
| 14 | film track | 52 | stop engaging 40 |
| 16 | cover plate | 54 | slot in 34 |
| 18 | image scanning device | 56 | exterior end of 54 |
| 20 | housing of 18 | 58 | deflector member |
| 22 | pivot | 60 | base plate |
| 24 | frame plate | 62, 64 | side walls |
| 26 | curved film guide surface of 14 | 66 | end portion |
| | | 68 | transverse, angled lip of 66 |
| 28 | elongated scan aperture | 70, 72 | downstream ends of 62, 64 |
| 30 | film deflector plate | 74 | back wall of 58 |
| 32 | opening in 16 opposite 28 | 76 | fastener |
| | | α | downward angle of 60 |
| 34 | bottom wall of 20 | 78 | conduit through 20 |
| 36 | window through 34 | 80 | branch conduit |
| 38 | circuit board | 82, 84 | guide blocks |
| 40 | sensor assembly | 86, 88 | angled air guide walls of 82, 84 |
| 42 | transparent cover glass | | |
| 44 | elongate linear array sensor | W | width of air stream passing over 42 |
| L | length of 44 | 90 to 100 | process steps |
| 46 | plane of 44 | | |

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. Apparatus for scanning photographic film, comprising:
   a scan gate having a film track to guide a filmstrip longitudinally in a direction of travel, a film guide surface in said film track, and an elongated scan aperture through said guide surface, said scan aperture being extended transverse to said film track;
   an image scanning device positioned opposite said scan aperture, said scanning device including a housing with a window, said housing enclosing an elongated array of sensors faced through said window toward said film track opposite said scan aperture, said array of sensors having a length and being spaced from said film guide surface; said scanning device further having a transparent cover between said sensors and said film guide surface; said array and said cover being extended transversely to said film track, whereby a passage for a filmstrip is defined between said cover and said film guide surface;
   a conduit for delivering pressurized air; and
   a deflector member mounted upstream of said passage for deflecting said air into said passage to clean debris from said cover, said deflector member being configured to spread said air into a thin stream moving in said direction of travel, said stream having a width transverse to said film track, said width being at least as long as said length of said array.

2. Apparatus according to claim 1, wherein said array of sensors is spaced from said film guide surface without interposition of optical means or beam splitting means.

3. Apparatus according to claim 1, wherein said conduit extends through said housing and said deflector member is mounted to said housing.

4. Apparatus according to claim 1, wherein said housing is movable away from said scan gate; and said deflector member is flexible and includes an end portion located near said cover; said deflector member further being configured so that said end portion contacts said scan gate when said housing is moved into engagement with said scan gate, thereby flexing said deflector member into position to deflect said air into said thin stream.

5. Apparatus according to claim 4, wherein said deflector member comprises an elongated base plate extended from said source toward said passage and a pair of side walls on said base plate between which said air flows; and said end portion includes a transverse lip angled to direct said thin stream essentially parallel to said cover.

6. Apparatus according to claim 5, wherein said side walls have downstream ends spaced from said transverse lip, whereby air flowing from between said walls spreads to produce said width of said stream.

7. Apparatus according to claim 5, wherein said housing comprises a slot through which said deflector member extends toward said passage; and said deflector member further comprises a back wall for closing an exterior end of said slot to minimize flow of said gas opposite to said direction of travel.

8. Apparatus according to claim 1, wherein said deflector member comprises an elongated base plate extended from said source toward said passage, a pair of side walls on said base plate between which said air flows, and a transverse lip angled to direct said thin stream toward said cover.

9. Apparatus according to claim 8, wherein said side walls have downstream ends spaced from said transverse lip, whereby air flowing from between said walls spreads to produce said width of said stream.

10. Apparatus according to claim 8, wherein said housing comprises a slot through which said deflector member extends toward said passage; and said deflector member further comprises a back wall for closing an exterior end of said slot to minimize flow of said gas opposite to said direction of travel.

11. Apparatus according to claim 1, wherein said deflector is flexible and includes an end portion located near said cover; said flow of pressurized air being effective to deflect said end portion into contact with said scan gate to deflect said air into said thin stream.

12. Apparatus according to claim 4 wherein the housing is pivotable away from the scan gate.

\* \* \* \* \*